United States Patent
Xiong et al.

(10) Patent No.: US 7,205,733 B2
(45) Date of Patent: Apr. 17, 2007

(54) SELF-STARTUP CIRCUIT FOR DC FAN

(75) Inventors: Jin-Liang Xiong, Shenzhen (CN); Feng-Long He, Shenzhen (CN); Yong-Xing You, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/263,614

(22) Filed: Oct. 31, 2005

(65) Prior Publication Data

US 2006/0091837 A1    May 4, 2006

(30) Foreign Application Priority Data

Oct. 30, 2004    (CN)   ................. 2004 1 0520642

(51) Int. Cl.
*H02P 1/18*    (2006.01)
(52) U.S. Cl. ............. 318/254; 318/471; 318/473; 388/800; 388/804; 388/811
(58) Field of Classification Search ............... None
See application file for complete search history.

(56) References Cited

U.S. PATENT DOCUMENTS

| | | | | |
|---|---|---|---|---|
| 4,656,553 A * | 4/1987 | Brown | ........... | 361/31 |
| 5,457,766 A * | 10/1995 | Ko | ........... | 388/831 |
| 6,023,139 A * | 2/2000 | Chin | ........... | 318/434 |
| 6,040,668 A * | 3/2000 | Huynh et al. | ........... | 318/471 |
| 6,188,187 B1 * | 2/2001 | Harlan | ........... | 318/254 |
| 6,381,406 B1 * | 4/2002 | Smith et al. | ........... | 318/799 |
| 6,385,395 B1 * | 5/2002 | Horng et al. | ........... | 388/809 |
| 6,545,438 B1 * | 4/2003 | Mays, II | ........... | 318/254 |
| 6,650,072 B2 * | 11/2003 | Harlan | ........... | 318/254 |
| 6,674,257 B2 * | 1/2004 | Xi | ........... | 318/254 |
| 6,879,120 B2 * | 4/2005 | Xi | ........... | 318/254 |
| 2002/0197068 A1 * | 12/2002 | Xi | ........... | 388/825 |
| 2003/0205975 A1 * | 11/2003 | Xi et al. | ........... | 318/254 |

FOREIGN PATENT DOCUMENTS

TW    092215559    8/2004

* cited by examiner

*Primary Examiner*—Lincoln Donovan
*Assistant Examiner*—Eduardo Colon Santana
(74) *Attorney, Agent, or Firm*—Morris Manning & Martin LLP; Tim Tingkang Xia, Esq.

(57) ABSTRACT

A self-startup circuit for a DC fan includes a voltage sampling device receiving a first control signal, a comparator, and a self-startup device. The comparator includes two input terminals and an output terminal. One input terminal is connected to an output terminal of the voltage sampling device. The self-startup device has a switching device and a diode connected in parallel. The self-startup device has an input terminal connected to the output terminal of the comparator, and outputs a second control signal for keeping the DC fan rotating even when the first control signal has a very low duty cycle.

14 Claims, 5 Drawing Sheets

SELF-STARTUP CIRCUIT FOR DC FAN

Reference is made to the copending U.S. patent application titled "START-UP CIRCUIT FOR DC FAN," filed on Oct. 11, 2005 with application Ser. No. 11/247,343, and assigned to the same assignee of the present invention.

BACKGROUND OF THE INVENTION

1. Field of the Invention

The present invention relates to a self-startup circuit for a direct current (DC) fan, and more particularly to a self-startup circuit which keeps running of a DC fan when no pulse signal is inputted.

2. General Background

Developments in today's highly information-intensive society have led to remarkable improvements in performances of electronic devices. During operation of many contemporary electronic devices such as central processing units (CPUs), large amounts of heat are produced. Typically, a fan is used to facilitate removal of heat. The fan must be running stably, so as to prevent the device from becoming unstable or being damaged. If the fan runs unstably or even ceases running, heat generated from the CPU will not be dissipated on time and will ruin the CPU. A startup circuit of the fan is quite important to ensure normal running of the fan.

FIG. 6 shows a conventional startup circuit of a DC fan. A Pulse-Width Modulation (PWM) control signal from a control chip directly drives transistors Q70 and Q100. The transistor Q70 and Q100 directly drives a DC fan. A high capacity electrolytic capacitor C63 is provided for wave filtering. When the startup circuit is started, a large start-up current is generated in the start-up instant, which will give an impact to or even ruin the transistors Q70 and Q100. Although the high capacity electrolytic capacitor C63 is adopted, voltage ripples still exist which makes the fan to rotate unstably. When the PWM control signal is very low and close to zero, that is, the duty cycle of the PWM control signal is very low and close to zero, the transistor Q71 is turned off. The fan therefore has incipient fault of stop running, thus cannot protect the CPU efficiently.

What is needed is a self-startup circuit which keeps running of a DC fan when no pulse signal is inputted.

SUMMARY

A self-startup circuit for a DC fan in accordance with a preferred embodiment includes a voltage sampling device receiving a first control signal, a comparator, and a self-startup device. The comparator includes two input terminals and an output terminal. One input terminal is connected to an output terminal of the voltage sampling device. The self-startup device has a switching device and a diode connected in parallel. The self-startup device has an input terminal connected to the output terminal of the comparator, and outputs a second control signal for keeping the DC fan rotating even when the first control signal has a very low duty cycle.

Via adding the self-startup device, that is, the switching device and the diode connected in parallel, when the duty cycle of a PWM digital control signal is zero or very low, the DC fan can still maintain rotation in a relative low speed. The problem of the DC fan ceasing rotation when the duty cycle is zero or very low is solved, a heat generating device such as a CPU is thereby protected efficiently. In addition, when the PWM digital control signal is fixed, the current passing through the DC fan is fixed, the rotation speed of the DC fan is fixed, thereby stabilizing running of the DC fan.

Other advantages and novel features will become more apparent from the following detailed description when taken in conjunction with the accompanying drawings, in which:

DETAILED DESCRIPTION OF THE EMBODIMENTS

Figure 1:
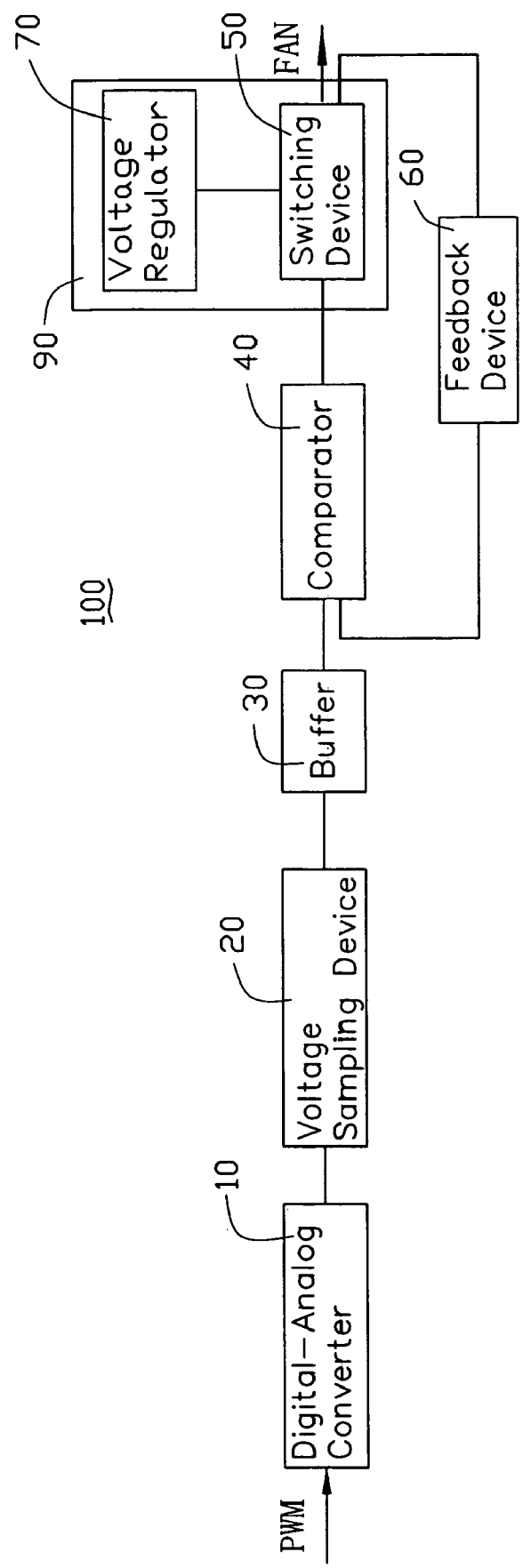
FIG. 1 is a system block diagram of a self-startup circuit for a DC fan in accordance with first and second embodiments of the present invention.

Referring to FIG. 1, a system block diagram of a self-startup circuit 100 for a DC fan in accordance with first and second embodiments of the present invention is shown. A pulse width modulation (PWM) digital control signal comes from a control chip such as a Super I/O chip (not shown). The PWM digital control signal has a fixed frequency. Generally, a duty cycle of the PWM digital control signal changes according to temperature of a heat generating electronic device such as a CPU. If the sensed temperature increases, the duty cycle increases, and a rotation speed of the DC fan increases. The self-startup circuit 100 includes a digital-analog converter 10, a voltage sampling device 20, a buffer 30, a comparator 40 as a voltage stabilizer, and a self-startup device 90, which are connected in series. The self-startup device 90 includes a switching device 50 and a voltage regulator 70 connected in parallel. The digital-analog converter 10 converts the PWM digital control signal to a smooth analog control signal. The analog control signal is inputted to an input terminal of the comparator 40 via the voltage sampling device 20 and the buffer 30. An output terminal of the comparator 40 is connected to the switching device 50 to drive the switching circuit 50 to control current passing through the DC fan. The self-startup circuit 100 further includes a feedback device 60 to control the current passing the switching circuit 50. An output signal of the switching device 50 is inputted to another input terminal of the comparator 40 via the feedback device 60.

Figure 2:
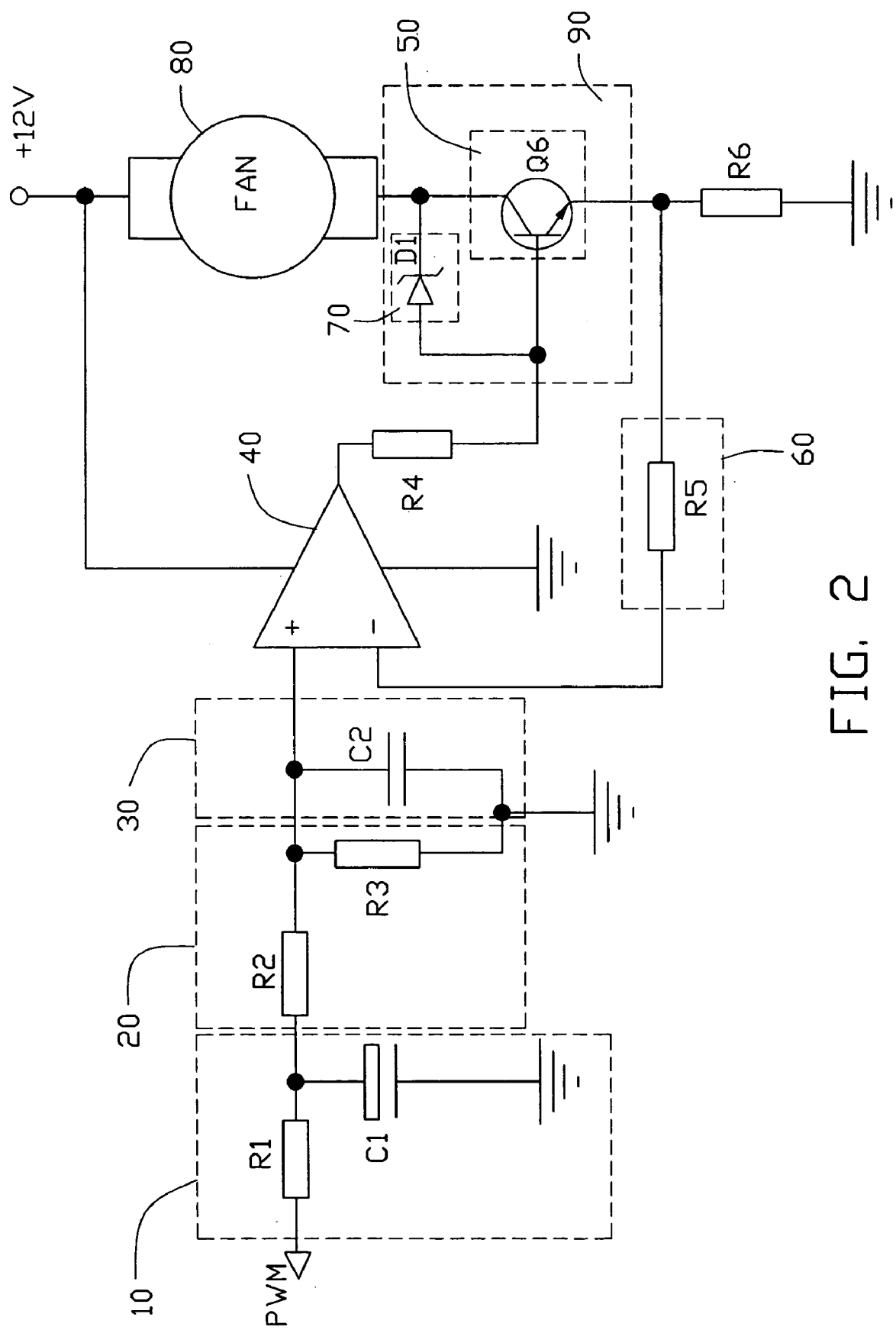
FIG. 2 is a circuit diagram of a self-startup circuit for a DC fan in accordance with the first preferred embodiment of the present invention.

Referring also to FIG. 2, a self-startup circuit 100 for a DC fan 80 in according with a first preferred embodiment of the present invention is shown. The digital-analog converter 10 includes an integral circuit that is composed of a resistor R1 and a capacitor C1 connected in series. An input terminal of the resistor R1 receives the PWM digital control signal of the control chip, an output terminal of the resistor R1 is connected to one end of the capacitor C1, and the other end of the capacitor C1 is grounded. The voltage sampling device 20 includes a resistor R2 and a resistor R3 connected in series. Resistances of the resistors R2 and R3 are configured to feed a suitable control voltage to the comparator 40 according to specifications of the DC fan 80. A node between respective ends of the resistors R2 and R3 is connected to a non-inverting input terminal of the comparator 40. The other end of the resistor R2 is connected to a node between the resistor R1 and the capacitor C1. The other end of the resistor R3 is grounded. The buffer 30 includes a capacitor C2. One end of the capacitor C2 is connected to the non-inverting terminal of the comparator 40, and the other end of the capacitor C2 is grounded. The switching circuit 50 of the self-startup device 90 includes a transistor such as a Bipolar Junction Transistor (BJT) Q6. The BJT Q6 has a base, an emitter, and a collector. The base of the BJT Q6 is connected to an output terminal of the comparator 40 via a resistor R4. The collector of the BJT Q6 is connected to the DC fan 80. The emitter of the BJT Q6 is grounded via a resistor R6. The voltage regulator 70 includes a voltage regulator diode D1. The voltage regulator diode D1 is connected to BJT Q6 in parallel. An anode of the voltage regulator diode D1 is connected to a base of the BJT Q6, and a cathode of the voltage regulator diode D1 is connected to a collector of the BJT Q6. The feedback device 60 includes a feedback resistor R5 providing current degenerative feedback. The emitter of the BJT Q6 outputs signals to an inverting input terminal of the comparator 40 via the feedback resistor R5. A 12 volt direct current supply is provided to the DC fan 80.

Self-startup function of the self-startup circuit 100 is achieved via the voltage regulator diode D1 being parallel connected between the base and the collector of the BJT Q6. When the duty cycle of the PWM digital control signal is zero, that is, no pulse signal is inputted to the comparator 40, the output voltage of the comparator is zero. At this time, the voltage regulator diode D1 is reverse bias, a voltage difference exists between the base and the collector of the BJT Q6. Therefore, the voltage regulator diode D1 is turned on, and the voltage of the base of the BJT Q6 is at a high level. The BJT Q6 is turned on, thereby the 12 volt direct current supply driving the DC fan 80 to rotate. As the CPU temperature increases, the duty cycle of the PWM digital control signal increases from zero, the output voltage of the comparator 40 increases, too. A base current of the BJT Q6 increases, therefore a collector current of the BJT Q6 increases, and the rotation speed of the DC fan 80 increases. A current passing through the DC fan is maintained constant via the feedback device 60.

Different DC fans have their specific specifications, in this embodiment, a certain DC fan is applied to illustrate the changing process from a self-startup status to a steady status as shown in table I.

TABLE I

Corresponding relation of working voltage and rotation speed of DC fan

| Voltage (V) | Current (A) | Frequency (Hz) | Resistance (Ω) | RPM |
|---|---|---|---|---|
| 3.193 | 0.014 | 0 | 228.1 | 0 |
| 3.203 | 0.015 | 0 | 213.5 | 0 |
| 3.306 | 0.027 | 0 | 122.4 | 0 |
| 3.404 | 0.079 | 46.84 | 43.1 | 1405 |
| 3.496 | 0.09 | 56.46 | 38.8 | 1694 |
| 3.596 | 0.099 | 61.07 | 36.3 | 1832 |
| 3.709 | 0.105 | 63.48 | 35.3 | 1904 |
| 3.802 | 0.109 | 65.84 | 34.9 | 1975 |
| 3.909 | 0.114 | 68.1 | 34.3 | 2043 |
| 4.094 | 0.121 | 72.36 | 33.8 | 2171 |
| 4.208 | 0.126 | 74.63 | 33.4 | 2239 |
| 4.312 | 0.131 | 76.55 | 32.9 | 2297 |

TABLE I-continued

Corresponding relation of working voltage and rotation speed of DC fan

| Voltage (V) | Current (A) | Frequency (Hz) | Resistance (Ω) | RPM |
|---|---|---|---|---|
| 4.41 | 0.134 | 78.15 | 32.9 | 2345 |
| 4.508 | 0.138 | 80.59 | 32.7 | 2418 |
| 4.613 | 0.142 | 83.17 | 32.5 | 2495 |
| 4.716 | 0.147 | 84.63 | 32.1 | 2539 |
| 4.801 | 0.149 | 86.63 | 32.2 | 2599 |
| 4.912 | 0.155 | 88.75 | 31.7 | 2663 |
| 5.108 | 0.163 | 93.11 | 31.3 | 2793 |
| 5.201 | 0.166 | 94.88 | 31.3 | 2846 |
| 5.313 | 0.171 | 96.56 | 31.1 | 2897 |
| 5.412 | 0.175 | 98.35 | 30.9 | 2951 |
| 5.509 | 0.18 | 100.6 | 30.6 | 3018 |
| 5.6 | 0.183 | 102.3 | 30.6 | 3069 |
| 5.7 | 0.187 | 103.1 | 30.5 | 3093 |
| 5.83 | 0.194 | 105.5 | 30.1 | 3165 |
| 5.93 | 0.197 | 107.4 | 30.1 | 3222 |
| 6.02 | 0.202 | 108.4 | 29.8 | 3252 |
| 6.11 | 0.205 | 109.7 | 29.8 | 3291 |
| 6.23 | 0.211 | 112.5 | 29.5 | 3375 |
| 6.32 | 0.215 | 113.7 | 29.4 | 3411 |
| 6.52 | 0.224 | 117.2 | 29.1 | 3516 |
| 6.61 | 0.227 | 118.4 | 29.1 | 3552 |
| 6.7 | 0.232 | 119.6 | 28.9 | 3588 |
| 6.81 | 0.237 | 121.3 | 28.7 | 3639 |
| 6.92 | 0.244 | 123.2 | 28.4 | 3696 |
| 7 | 0.246 | 124.8 | 28.5 | 3744 |
| 7.12 | 0.253 | 127.3 | 28.1 | 3819 |
| 7.22 | 0.257 | 127.7 | 28.1 | 3831 |
| 7.31 | 0.261 | 128.5 | 28.0 | 3855 |
| 7.4 | 0.264 | 130.3 | 28.0 | 3909 |
| 7.51 | 0.271 | 131.4 | 27.7 | 3942 |
| 7.59 | 0.275 | 132.8 | 27.6 | 3984 |
| 7.72 | 0.279 | 135.1 | 27.7 | 4053 |
| 7.79 | 0.282 | 135.3 | 27.6 | 4059 |
| 7.91 | 0.288 | 137.5 | 27.5 | 4125 |
| 8.07 | 0.296 | 139.5 | 27.3 | 4185 |
| 8.12 | 0.297 | 140 | 27.3 | 4200 |
| 8.24 | 0.303 | 142.4 | 27.2 | 4272 |
| 8.3 | 0.307 | 142.7 | 27.0 | 4281 |
| 8.4 | 0.309 | 144.8 | 27.2 | 4344 |
| 8.52 | 0.316 | 145.1 | 27.0 | 4353 |
| 8.61 | 0.319 | 147.1 | 27.0 | 4413 |
| 8.72 | 0.324 | 149.7 | 26.9 | 4491 |
| 8.84 | 0.33 | 150.2 | 26.8 | 4506 |
| 8.94 | 0.332 | 151.5 | 26.9 | 4545 |
| 9.06 | 0.341 | 152.5 | 26.6 | 4575 |
| 9.13 | 0.339 | 153.5 | 26.9 | 4605 |
| 9.23 | 0.344 | 156.2 | 26.8 | 4686 |
| 9.29 | 0.346 | 157.3 | 26.8 | 4719 |
| 9.41 | 0.35 | 157.4 | 26.9 | 4722 |
| 9.5 | 0.353 | 159.5 | 26.9 | 4785 |
| 9.63 | 0.362 | 160.4 | 26.6 | 4812 |
| 9.71 | 0.364 | 161.8 | 26.7 | 4854 |
| 9.81 | 0.366 | 162.1 | 26.8 | 4863 |
| 9.9 | 0.37 | 164.1 | 26.8 | 4923 |
| 10.1 | 0.376 | 166.3 | 26.9 | 4989 |
| 10.21 | 0.381 | 168.1 | 26.8 | 5043 |
| 10.3 | 0.387 | 168.4 | 26.6 | 5052 |
| 10.39 | 0.389 | 170.3 | 26.7 | 5109 |
| 10.49 | 0.392 | 170.9 | 26.8 | 5127 |
| 10.59 | 0.396 | 172.1 | 26.7 | 5163 |
| 10.72 | 0.404 | 172.4 | 26.5 | 5172 |
| 10.82 | 0.409 | 173.8 | 26.5 | 5214 |
| 10.9 | 0.409 | 174.8 | 26.7 | 5244 |
| 10.99 | 0.413 | 177.1 | 26.6 | 5313 |
| 11.12 | 0.419 | 177.3 | 26.5 | 5319 |
| 11.18 | 0.424 | 178.4 | 26.4 | 5352 |
| 11.3 | 0.425 | 179.1 | 26.6 | 5373 |
| 11.4 | 0.428 | 179.7 | 26.6 | 5391 |
| 11.49 | 0.432 | 181.2 | 26.6 | 5436 |
| 11.62 | 0.435 | 181.7 | 26.7 | 5451 |
| 1.72 | 0.44 | 182.1 | 3.9 | 5463 |
| 11.83 | 0.44 | 184.8 | 26.9 | 5544 |
| 12.01 | 0.451 | 187.1 | 26.6 | 5613 |
| 12.12 | 0.457 | 188.5 | 26.5 | 5655 |
| 12.19 | 0.458 | 186.3 | 26.6 | 5589 |

TABLE I-continued

Corresponding relation of working voltage and rotation speed of DC fan

| Voltage (V) | Current (A) | Frequency (Hz) | Resistance (Ω) | RPM |
|---|---|---|---|---|
| 12.32 | 0.459 | 189.2 | 26.8 | 5676 |
| 12.42 | 0.467 | 189.1 | 26.6 | 5673 |
| 12.47 | 0.469 | 189.4 | 26.6 | 5682 |
| 12.57 | 0.473 | 190.1 | 26.6 | 5703 |

When the PWM digital control signal is inputted to the self-startup circuit 100, in a certain duty cycle, a working current of the DC fan 80 is measured, then according to the TABLE I, the rotation speed of the DC fan 80 is found.

Figure 3:
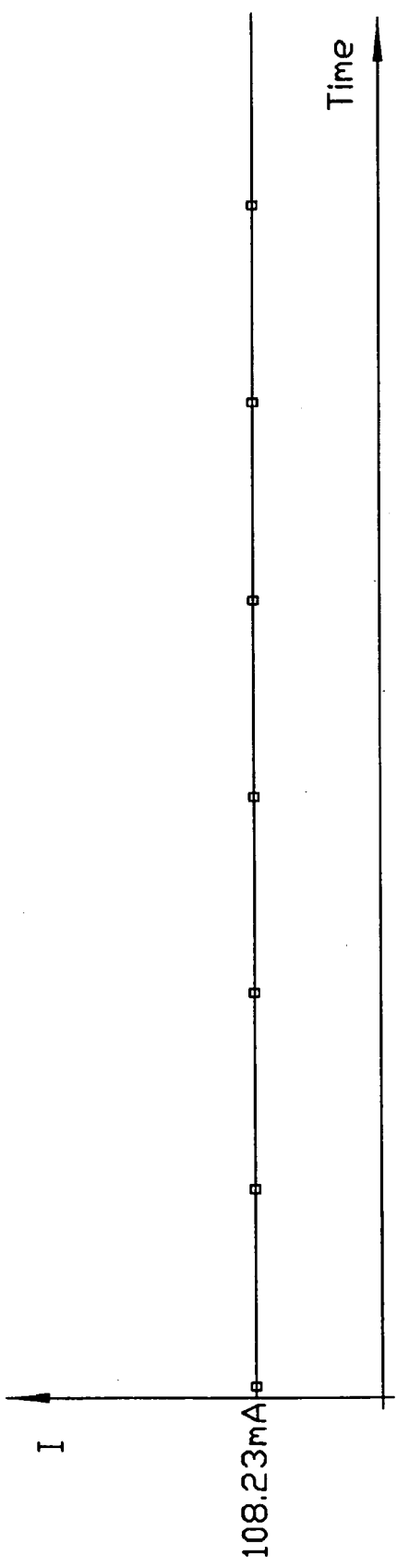
FIG. 3 is a graph of a current passing through a transistor of the self-startup circuit of FIG. 2 versus time when a duty cycle of a PWM digital control signal is 0.002%.
Figure 4:
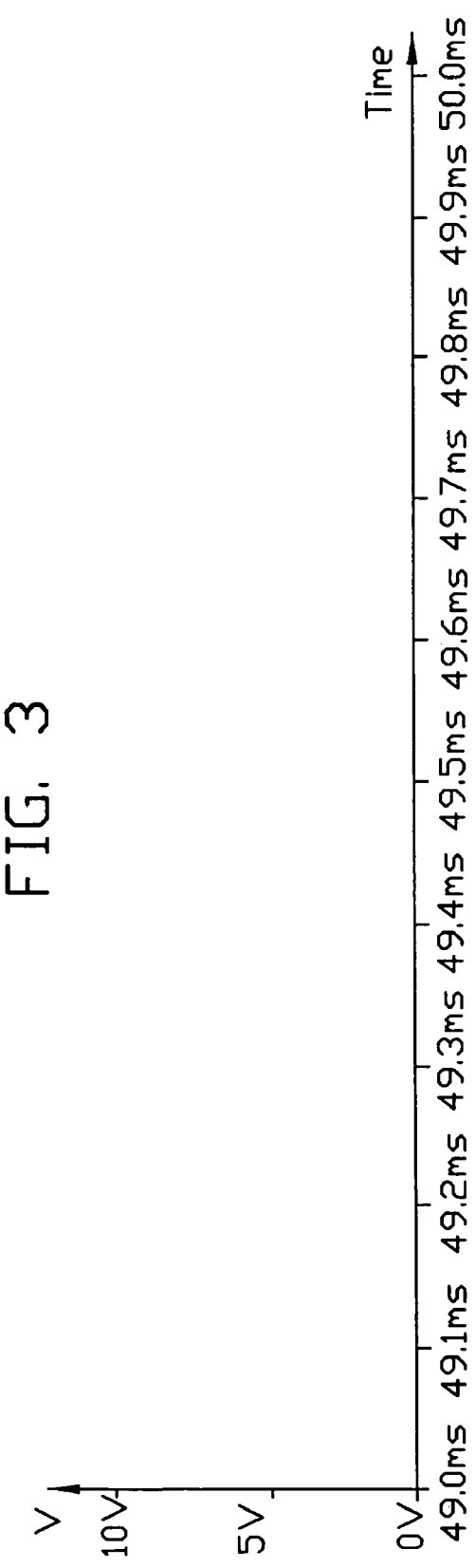
FIG. 4 is a graph of an output voltage of a comparator of the self-startup circuit of FIG. 2 versus time when a duty cycle of a PWM digital control signal is 0.002%.

FIGS. 3 and 4 show graphs of a current passing through the BJT Q6 and an output voltage of the comparator 40 respectively versus time when the PWM digital signal has a 43 μs cycle, a 0.002% duty cycle, and a 5.25V impulse amplitude. When the duty cycle D is 0.002%, that is, substantially equal to no impulse signal is inputted, the output voltage of the comparator 40 is zero, however, there is a current passing through the collector of the BJT Q6, the current is 108.23 mA. That is, in a condition that no voltage is outputted from the comparator 40, the BJT Q6 is turned on because of the voltage regulator diode D1, the DC fan 80 is therefore driven. Via searching the TABLE I, the rotation speed of the DC fan 80 is 1950 RPM. Thus, the DC fan 80 is self-started up when the duty cycle of the PWM digital control signal is very low that closes to zero. This will prevent the DC fan from ceasing rotation when the duty cycle of the PWM digital signal is close to zero, therefore protecting the CPU efficiently.

As the CPU temperature increases, the sensed temperature indicates the duty cycle D of the PWM digital control signal to rise from zero. When the duty cycle D reaches 4%, the output voltage of the comparator 40 is still zero, and the BJT Q6 is still turned on. The current passing through the collector of the BJT Q6 is 108.23 mA, and it is from the TABLE I that the rotation speed of the DC fan 80 is 1950 RPM.

When the duty cycle D reaches 7%, the output voltage of the comparator 40 is at a high level (1.44V), and the base of the BJT Q6 is provided with a drive current. At this time, the voltage regulator diode D1 is turned off. The current passing through the collector of the BJT Q6 is 126.9 mA, and it is from the TABLE I that the rotation speed of the DC fan 80 is 2239 RPM. Thus, when the duty cycle D is 7%, the DC fan 80 is losing the function of self-startup, and the self-startup circuit 100 is changing from the self-startup status to the steady status.

When the duty cycle D reaches 10%, the output voltage of the comparator 40 is 2V, and the current passing through the base of the BJT Q6 continuously increases. At this time, the voltage regulator diode D1 is turned off, and the current passing through the collector of the BJT Q6 is 180.9 mA. It is from the TABLE I that the rotation speed of the DC fan 80 is 3093 RPM.

When the duty cycle D reaches 95%, the output voltage of the comparator 40 is 10.5V, and the current passing through the base of the BJT Q6 continuously increases. At this time, the voltage regulator diode D1 is turned off, and the current passing through the collector of the BJT Q6 is 420 mA. It is from the TABLE I that the rotation speed of the DC fan 80 is 5319 RPM.

In other words, when the duty cycle D of the PWM digital control signal is changed in the range of 10%~100%, the rotation speed of the DC fan 80 changes closely following the changes of impulse width of the PWM digital control signal. Furthermore, as the duty cycle D increases, the output voltage of the comparator 40 increases gradually, the base current of the BJT Q6 increases, the voltage of the inverting input terminal increases, resulting in the voltage of the non-inverting input terminal decreasing, and the output voltage decreasing, thereby the base current of the BJT Q6 decreases, and the collector current of the BJT Q6 decreases, that is, the current passing through the DC fan 80 decreases. After a period of time, the circuit 100 reaches the steady status, the duty cycle of the PWM digital control signal is remained the same, that is, the impulse width is remained the same, the output voltage of the comparator 40 and the current of the DC fan 80 are kept constant, and the DC fan 80 rotates steadily.

Figure 5:
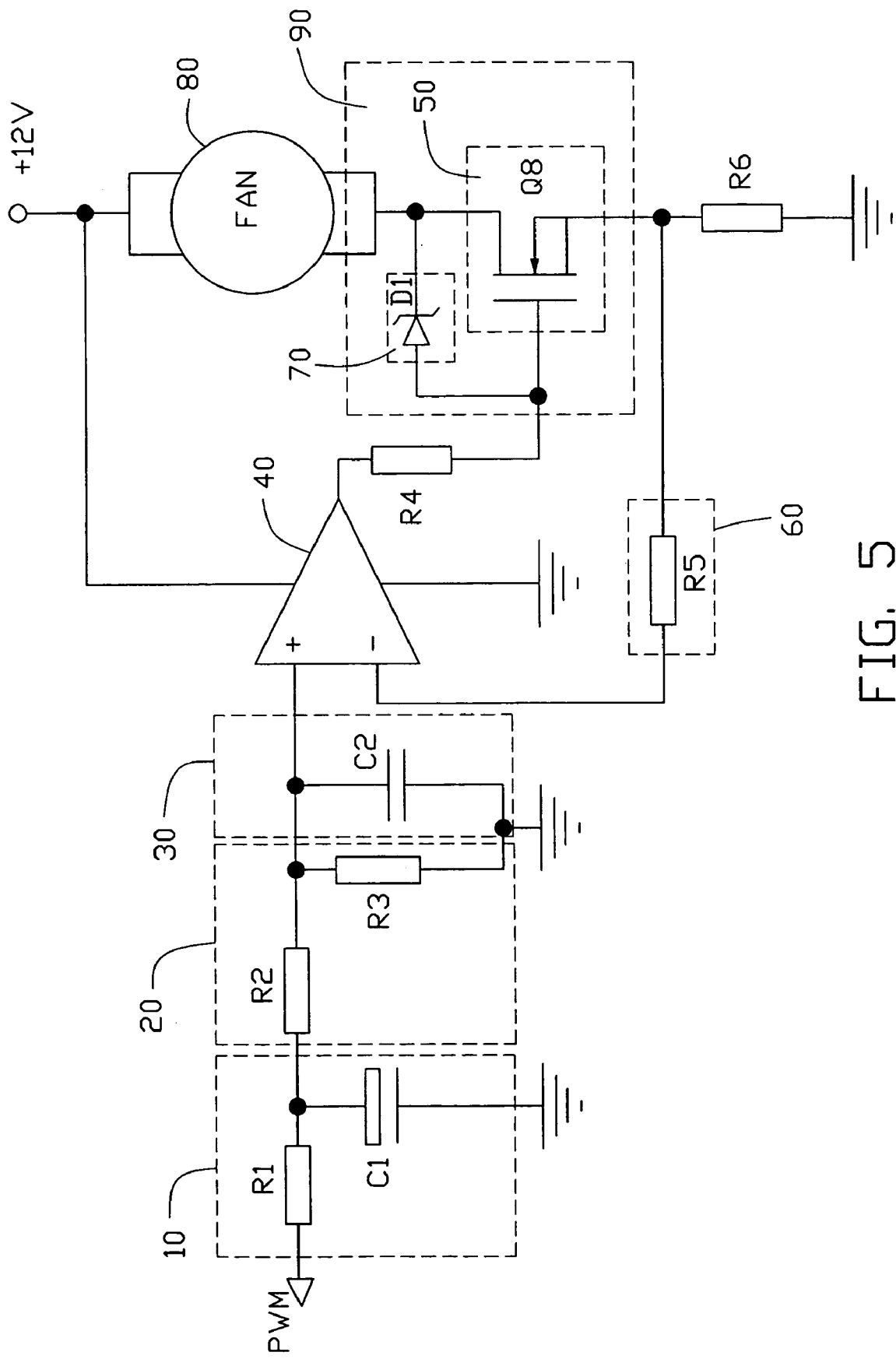
FIG. 5 is a circuit diagram of a self-startup circuit for a DC fan in accordance with the second preferred embodiment of the present invention.
Figure 6:
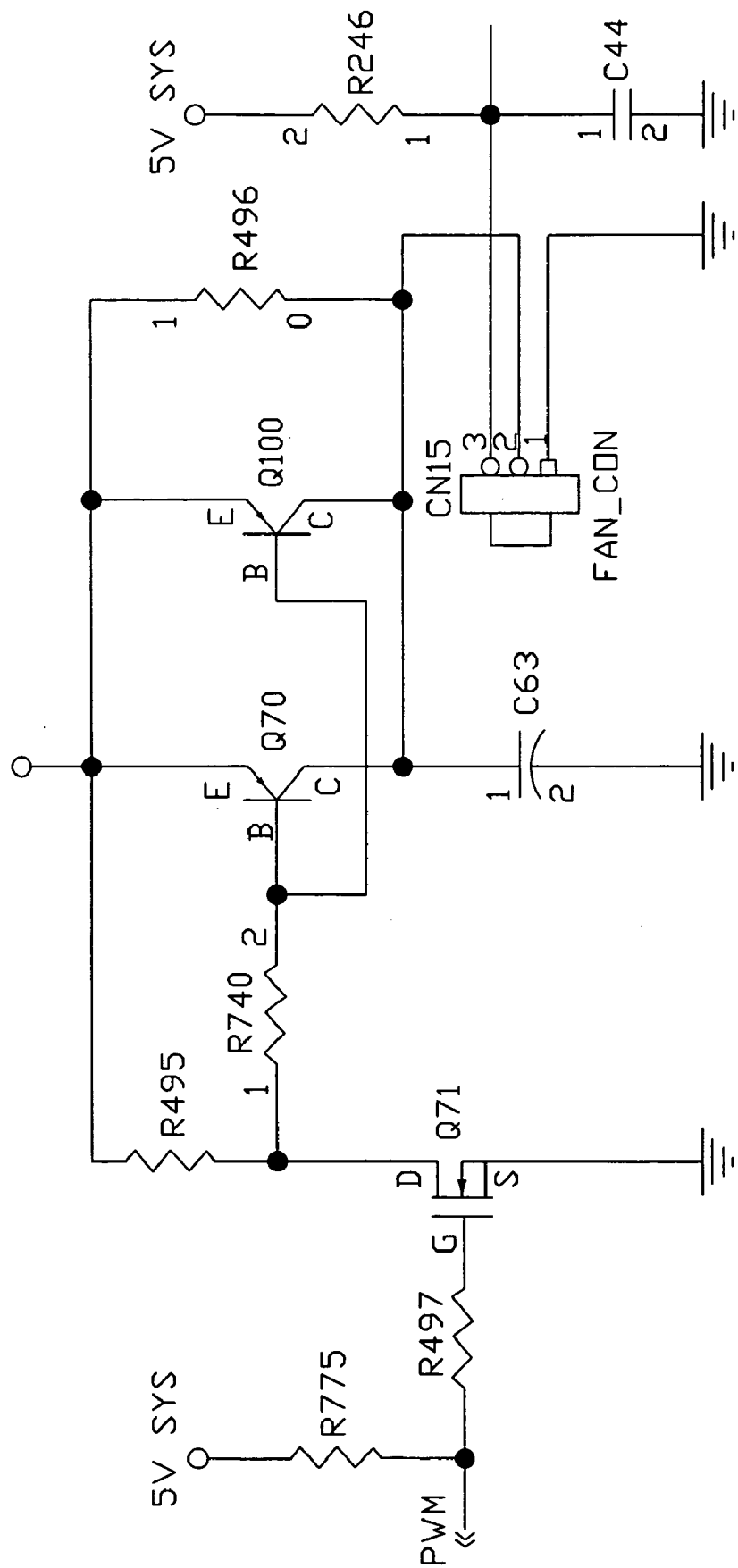
FIG. 6 is a circuit diagram of a conventional startup circuit for a DC fan.

FIG. 5 shows a self-startup circuit in accordance with the second preferred embodiment of the present invention, and a DC fan 80 connected with the self-startup circuit. The self-startup circuit of the second preferred embodiment is similar to the self-startup circuit 100 of the first preferred embodiment. However, instead of having a switching device 50, self-startup circuit of the second preferred embodiment has a switching circuit 50'. The switching circuit 50' includes a Metal-Oxide Semiconductor Field Effect Transistor (MOSFET) Q8.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A self-startup circuit for a DC fan comprising:
   a digital-analog converter receiving a pulse width modulation (PWM) signal, and converting the PWM signal to a control signal;
   a voltage sampling device receiving the control signal, the voltage sampling device comprising an output terminal for outputting a divided voltage by the voltage sampling device;
   a comparator comprising two input terminals and an output terminal, one of the input terminals connected to the output terminal of the voltage sampling device to receive the divided voltage; and
   a self startup device comprising a transistor and a voltage regulator, the transistor having a first terminal connected to the output terminal of the comparator, a second terminal, and a third terminal grounded, the voltage regulator connected between the first and second terminals of the transistor;
   wherein the DC fan is connected between a DC power source and the second terminal of the transistor.

2. The self-startup circuit as claimed in claim 1, wherein the voltage regulator comprises a voltage regulator diode connected between the first and second terminals of the transistor.

3. The self-startup circuit as claimed in claim 2, wherein an anode of the voltage regulator diode is connected to the first terminal of the transistor and a cathode of the voltage regulator diode is connected to the second terminal of the transistor.

4. The self-startup circuit as claimed in claim 2, further comprising a feedback device for automatically adjusting current passing through the transistor, wherein the feedback device comprises a feedback resistor, an output signal from the third terminal of the transistor is inputted to the other one of the input terminals of the comparator via the feedback device.

5. The self-startup circuit as claimed in claim 2, wherein the transistor is one of a Bipolar Junction Transistor (BJT) and a Metal-Oxide Semiconductor Field Effect Transistor (MOSFET).

6. The self-startup circuit as claimed in claim 1, further comprising a buffer connected between the voltage sampling device and the comparator, for preventing a large current flow at the instant of power turn-on of the self-startup circuit.

7. The self-startup circuit as claimed in claim 6, wherein the buffer comprises a capacitor, one end of the capacitor is connected to said one of the input terminals of the comparator, and the other end of the capacitor is grounded.

8. The self-startup circuit as claimed in claim 1, wherein the digital-analog converter comprises an integral circuit that has a first resistor and a capacitor connected in series.

9. The self-startup circuit as claimed in claim 8, wherein the voltage sampling device comprises a second resistor and a third resistor connected in series, a node between the second and third resistors is connected to said one of the input terminals of the comparator, the second resistor is connected to a node between the first resistor and the first capacitor, and the third resistor is grounded.

10. A startup device for a direct current (DC) fan, comprising:
a voltage sampling device receiving a first control signal and translate said first control signal to a second control signal different from said first control signal;
a switching device electrically connectable with a direct current (DC) fan in order to activate said fan;
a voltage stabilizer electrically connectable between said voltage sampling device and said switching device, said voltage stabilizer accepting said second control signal from said voltage sampling device and transmitting said second control signal to said switching device in order to activate said fan based on said second control signal; and
a voltage regulator electrically connectable between said fan and said voltage stabilizer beside said switching device so as to control second-control-signal-acceptance of said switch device.

11. The startup circuit as claimed in claim 10, wherein said voltage regulator is in a parallel connection relationship with said switching device.

12. The startup circuit as claimed in claim 10, wherein said switching device is a selective one of a Bipolar Junction Transistor (BJT) and a Metal-Oxide Semiconductor Field Effect Transistor (MOSFET).

13. The startup circuit as claimed in claim 10, further comprising a feedback device for automatically adjusting electrical current passing through said switch device, said feedback device electrically connectable between said switch device and said voltage stabilizer so as to input signals of said electrical current through said switch device to said voltage stabilizer.

14. A self-startup circuit for a DC fan comprising:
a voltage sampling device receiving a first control signal, the voltage sampling device comprising an output terminal;
a comparator comprising two input terminals and an output terminal, one of the input terminals connected to the output terminal of the voltage sampling device;
a self startup device having an input terminal connected to the output terminal of the comparator, and outputting a second control signal for keeping the DC fan rotating, wherein the self-startup device comprises a switching device and a voltage regulator connected in parallel, the switching device comprises a transistor, the transistor comprises a first terminal, a second terminal and a third terminal, the voltage regulator comprises a voltage regulator diode parallel connected between the first and second terminals of the transistor; and
a feedback device for automatically adjusting current passing through the transistor, wherein the feedback device comprises a feedback resistor, an output signal from the third terminal of the transistor is inputted to the other one of the input terminals of the comparator via the feedback device.

* * * * *